United States Patent [19]
Yoshida

[11] Patent Number: 5,515,101
[45] Date of Patent: May 7, 1996

[54] TITLE GENERATOR FOR A VIDEO CAMERA

[75] Inventor: Tadahiro Yoshida, Osaka, Japan

[73] Assignee: Minolta Co., Ltd., Osaka, Japan

[21] Appl. No.: 217,454

[22] Filed: Mar. 24, 1994

Related U.S. Application Data

[62] Division of Ser. No. 979,466, Nov. 20, 1992, abandoned, which is a continuation of Ser. No. 512,801, Apr. 23, 1990, abandoned.

[30] Foreign Application Priority Data

Apr. 28, 1989 [JP] Japan ..................................... 1-110150
Feb. 27, 1990 [JP] Japan ..................................... 2-47633

[51] Int. Cl.$^6$ .................................................. H04N 5/225
[52] U.S. Cl. .......................... 348/239; 348/232; 348/233; 358/335
[58] Field of Search .............................. 348/207, 96, 231, 348/232, 906, 233; 358/335; H04N 5/225

[56] References Cited

U.S. PATENT DOCUMENTS 4,999,709  3/1991  Yamazaki et al. ...................... 340/724
5,031,043  7/1991  Rocco ..................................... 348/592
5,124,814  6/1992  Takahashi et al. ..................... 358/335

FOREIGN PATENT DOCUMENTS

| 61-24378 | 3/1986 | Japan . | |
| 62-99044 | 6/1987 | Japan . | |
| 62-144292 | 6/1987 | Japan . | |
| 62-203489 | 8/1987 | Japan . | |
| 62-32778 | 12/1987 | Japan .............................. | H04N 5/225 |
| 63-172577 | 2/1988 | Japan . | |
| 63-174477 | 7/1988 | Japan .............................. | H04N 5/232 |
| 1-196981 | 8/1989 | Japan .............................. | H04N 5/278 |
| 1-314077 | 12/1989 | Japan .............................. | H04N 5/225 |
| 3-58680 | 3/1991 | Japan .............................. | H04N 5/278 |

Primary Examiner—Wendy R. Greening
Assistant Examiner—Tuan V. Ho
Attorney, Agent, or Firm—Price, Gess & Ubell

[57] ABSTRACT

A title generator (titler) for a video camera judges whether a title fits the current time (month, season, etc.) and selects only those titles adequate to the time, thereby preventing unnecessary titles from appearing on the display and saving title selecting time. Also disclosed is a video camera system with a titler including an external memory which stores a group or groups of relevant titles. The external title memory can be used in combination with a conventional internal title memory.

12 Claims, 9 Drawing Sheets

S1: TITLE START
S2: NEXT TITLE
S3, S4: CLOCK ADJUST

TITLE GENERATOR FOR A VIDEO CAMERA

This is a division of prior application Ser. No. 07/979,466, filed on Nov. 20, 1992, (abandoned) for a TITLE GENERATOR FOR A VIDEO CAMERA, which is a continuation of Ser. No. 07/512,801, filed on Apr. 23, 1990 (abandoned).

BACKGROUND OF THE INVENTION

The present invention relates to a device for making a picture title in a video camera.

DESCRIPTION OF THE PRIOR ART

Some recent video cameras have, or are adaptable with, a title generator ("titler" hereafter) which superimposes a title on a video picture. In one type of conventional titler, a user can compose a title by selecting characters from up to 40 alphanumerical and symbol characters. In this type of titler, the characters appear one by one by pressing a key, and a desired one is selected by pressing another key. Note that a keyboard with 26 alphabetical keys does not fit a portable video camera. This allows the user to compose any letter title he wants, but a disadvantage is that it takes a long time if he desires a meaningful sentence. This often discourages users from using the titler. Further, in Japan or any other country using over 3,000 chinese characters, the method is impractical.

Another type of conventional titlers for overcoming the above difficulty prepares some ready-made titles in its system. Each title includes meaningful message suited for a specific situation (e.g., "Happy birthday!", etc.), and the user only selects one of those titles according to the desired situation.

SUMMARY OF THE INVENTION

As video cameras became popular, the number of built-in titles should grow to accommodate various situations. As the number grows, however, selection of a desired title becomes difficult: if 50 titles are prepared in the system, an operator may have to press a selector key 49 times at most, which again discourages the user from using the titler.

An object of the present invention is to provide a titler in which a large number of titles are prepared in the video system while still permitting the user to select a desired title quickly.

Another object of the present invention is to provide a titler system that can handle a large number of titles pre-stored for various situations without troublesome operations.

These and other objects are achieved by the camera system of the present invention that is capable of superimposing a title onto a video signal generated by a picture circuit of the video camera. A feature of the camera system is characterized by comprising: a title storage for storing a plurality of titles; a clock for generating time information; and selecting means for selecting a title or titles that respond to the current time information among the titles in the title storage.

The present invention includes many other features for achieving the objects and the features which are described in detail in the description of embodiments that follows.

BRIEF DESCRIPTION OF THE ATTACHED DRAWINGS

FIG. 2 is a flowchart of a routine executed by the microcomputer of the titler when the titler main switch S1 is turned on.

FIGS. 3A and 3B are flowcharts of two examples of routines that can be executed when the title selection switch S2 is turned on.

FIG. 4 is a flowchart of another routine executed when the switch S2 is turned on.

FIG. 5 is a flowchart of another routine executed when the switch S1 is turned on.

DETAILED DESCRIPTION OF PREFERRED EMBODIMENTS

Figure 1:
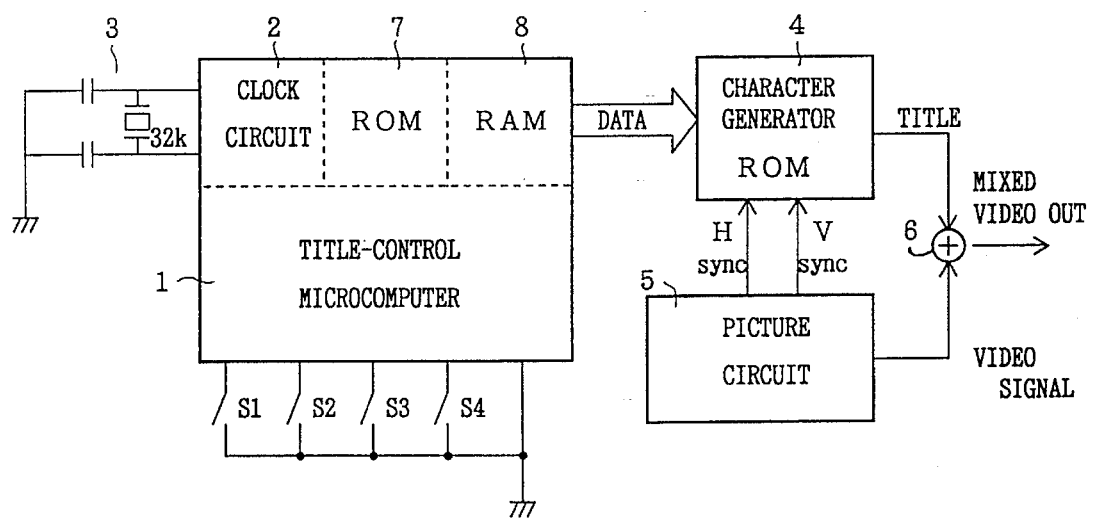
FIG. 1 is a block diagram of the titler of the first embodiment.

The first embodiment is a titler built into a video camera, whose electrical structure is shown in FIG. 1. The titler is controlled by a microcomputer including a clock circuit 2, ROM 7 and RAM 8. The clock circuit 2 is connected to an external oscillation circuit 3 including a quartz oscillator. The microcomputer 1 is also connected to four external switches S1, S2, S3 and S4. Switches S1 and S2 are used in title selection, which is detailed later, and switches S3 and S4 are used to correct calendar and time of the clock 2. Data from the microcomputer 1 is sent to a character generator ROM (CG-ROM) 4, which is connected to a picture circuit 5 of the video camera. The output of the CG-ROM 4 (which is a video signal conveying title) and the output of the picture circuit 5 (which is a video signal conveying a picture taken by the camera) are mixed at an adder 6 to produce a mixed video signal.

The microcomputer 1 can get the current time information (typically, data of year, month, day, hour, minute and second) any time from the clock circuit 2. If the titler microcomputer 1 does not have the clock circuit 2, the time information can be given from an auto-calendar circuit provided in the camera body.

In the ROM 7 of the microcomputer 1 are stored data of many titles. The titles are prepared to cover many situations, and are classified into groups of similar situations. It is preferable to arrange the groups or titles according to a rational order (e.g., according to the chronology) in the ROM 7. Each title data stored in the ROM 7 includes an attribute data that can be searched and retrieved. In the present embodiment, each title of one group has an attribute data representing a month or months relating to the title. For example, as shown in Table 1, the title No. 1 "HAPPY NEW YEAR" of group A has an attribute data representing January. In another group B, each title has an attribute data representing a season. The title No. 1 "SPRING VACATION" of group B has an attribute data representing spring (which also represents the months of March, April and May). Titles in group C have an attribute "general" to be applicable to any time. The attribute data could be formed as a portion of the address for a specific title.

Figure 2:
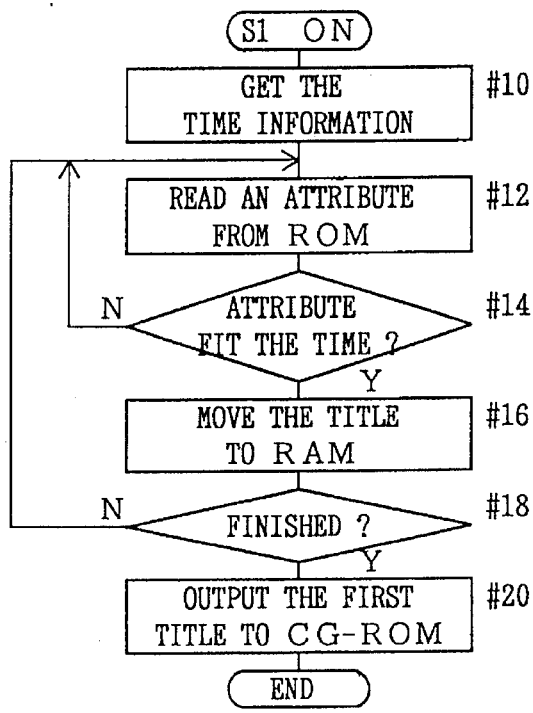

Returning to FIG. 1, switch S1 is for starting the titler. When the switch S1 is turned on, the microcomputer 1 initializes the titler function as shown by the flowchart of FIG. 2. First the CPU of the microcomputer 1 gets the time information (of the current time) from the clock circuit 2 at step #10. Then the CPU reads out the attribute of a title from the ROM 7 at step #12, and checks if the attribute fits the time information at step #14. Only those titles fitting the time information are thus chosen at step #14 and stored in the RAM 8 at step #16. For example, if current time is in March, only three titles (Nos. 5–7) of group A are transferred from ROM 7 to RAM 8, and other titles are not transferred. Because March belongs to spring, only five titles (Nos. 1–5) of group B are transferred to RAM 8. Since the titles of group C are general with respect to time, all titles of group C are transferred to RAM 8. When the title transfer from ROM 7 to RAM 8 is finished (step #18), the data of first title in the RAM 8 is sent to the CG-ROM 4 at step #20, whereby the first title appears on the monitor display of the video camera. This is the end of the initialization.

Figure 3A:
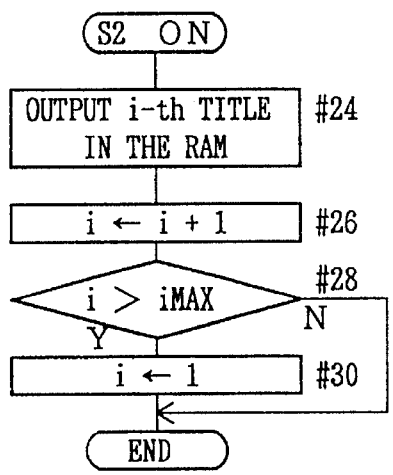

Switch S2 is used to change the title appearing on the display. Every time the switch S2 is pressed, the routine as shown in FIG. 3A is executed. First at step #24, the ith title in the RAM 8 is output to the CG-ROM 4 (whereby the title appears on the display). Then the variable i is incremented by 1 at step #26 and is checked if it exceeds its maximum value $i_{MAX}$ at step #28. If $i>i_{MAX}$, variable i is initialized to 1 at step #30 and the routine ends. Thus every time the switch S2 is pressed, the title in the RAM 8 is output on the display one by one.

Figure 3B:
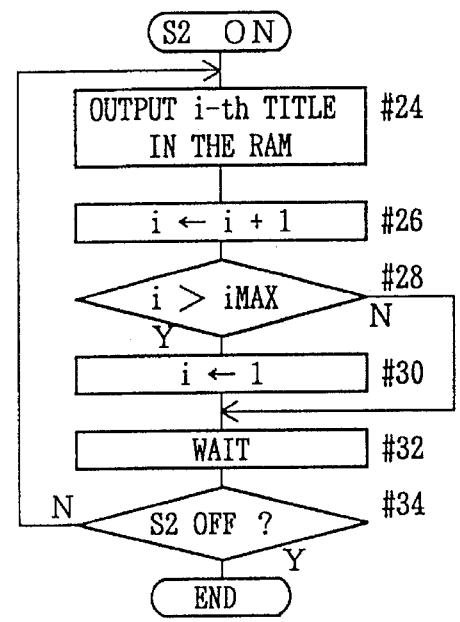

It is possible of course to consecutively roll the titles the switch S2 pressed, instead of pressing every time. In this case, the routine is as shown in FIG. 3B. Here, after step #30, the CPU waits a predetermined time period at step #32 and while the switch S1 is on, the process returns to step #24 to automatically output the next title.

Figure 4:
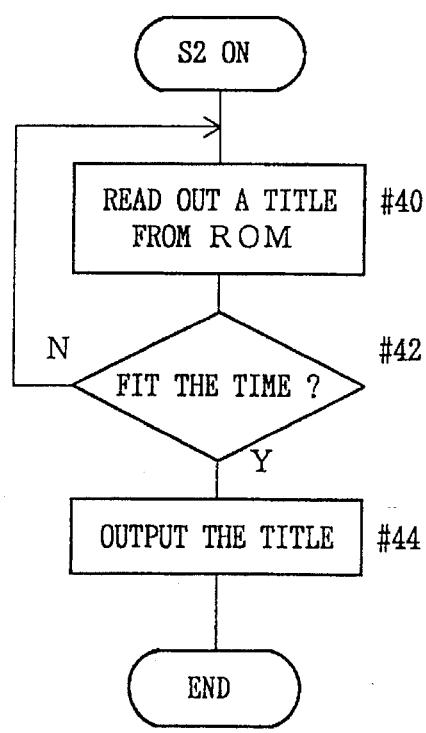

It is not necessary to provide RAM 8 in the titler. Instead, the title in the ROM 7 can be directly output to the CG-ROM 4. As shown in FIG. 4, when the switch S2 is pressed, the CPU of the titler can read out a title from the ROM 7 (step #36), and output the title if it fits the time information given from the clock circuit 2 (steps #38 and #40). If the read-out title does not fit, the next title is read out from the ROM 7, and the search continues until a proper title is found (steps #38 and #36).

Figure 5:
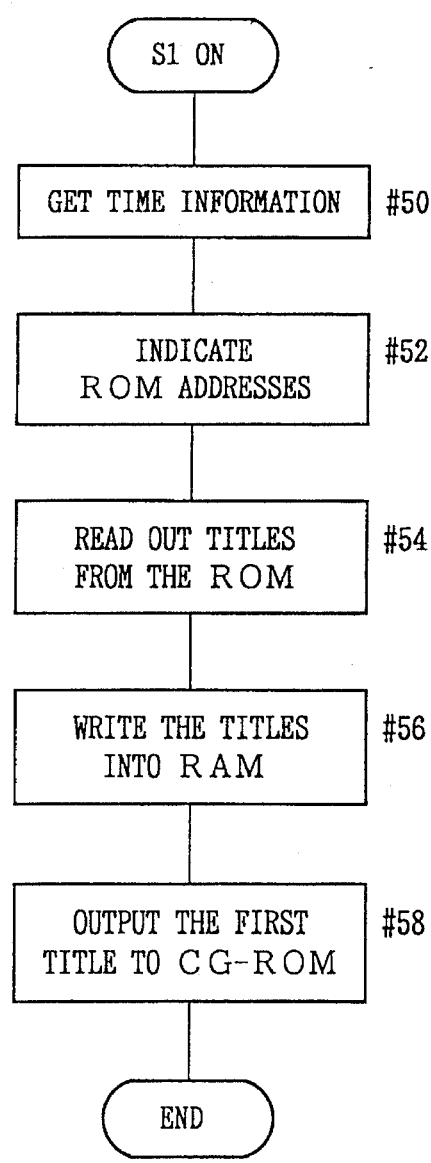

In the above examples, each title has an attribute in the ROM 7. If the titles are classified into groups and each group is located in a predetermined region in the ROM 7, the attribute data is unnecessary. In this case, as shown in the flowchart of FIG. 5, the CPU of the controller 1 first can get the time information from the clock circuit 2 at step #50, then indicates a start address and an end address of the region in the ROM 7 where the group of titles fitting the time are stored at step #52. The CPU reads out the titles of the group from the region at step #54 and writes the titles into the RAM 8 at step #56. Then the first title in the RAM 8 is output to the CG-ROM 4 at step #58 as step #20 of FIG. 2, and the titles in the RAM 8 are output to the display one by one as in FIGS. 3A and 3B.

In any case, since the number of titles in the RAM 8 is smaller than that in the ROM 7, the title search is easier and faster than in conventional titlers. For example, in the case of titles in Table 1, only 3+5+20=28 titles are transferred to RAM 8 among 20+30+20=70 titles in the ROM 7 in March. Further, since the titles in the RAM 8 are relevant to current time, the user does not miss a desired title.

The attribute of the title can be other than month or season. For example, some titles can be classified by daytime and nighttime. Other titles can be classified by the days of the week. Even hour time can be an attribute of a title (e.g., for "LUNCH CHAT"). In the above explanation, the time information given from the clock is the current time. But the time information can be a preset time after (or before) the current time. Further, since some cameras have a data storage of film-loading time, the film-loading time information can be used in selecting the titles. Still further, the attribute need not be limited to just time. If the video camera can provide a particular kind of information to the titler that would logically relate to a series of titles, the ready-made titles can then be classified according to that information, and only those titles relating to the information given from the camera are selectively output to the display.

The title data in the ROM 7 (hence the data in the RAM 8) are in the form of character code data. The code data of characters composing the title selected by the switch S2 are sent from the RAM 8 to the CG-ROM 4, where the code data are converted into dot data. An image of the title is constructed and the image data is converted into a video signal referring to the synchronizing signals (H-sync and V-sync) from the picture circuit 5. The title video signal is mixed at the adder 6 with the picture video signal from the camera picture circuit 5, and the mixed video signal is output to the monitor display.

Figure 6:
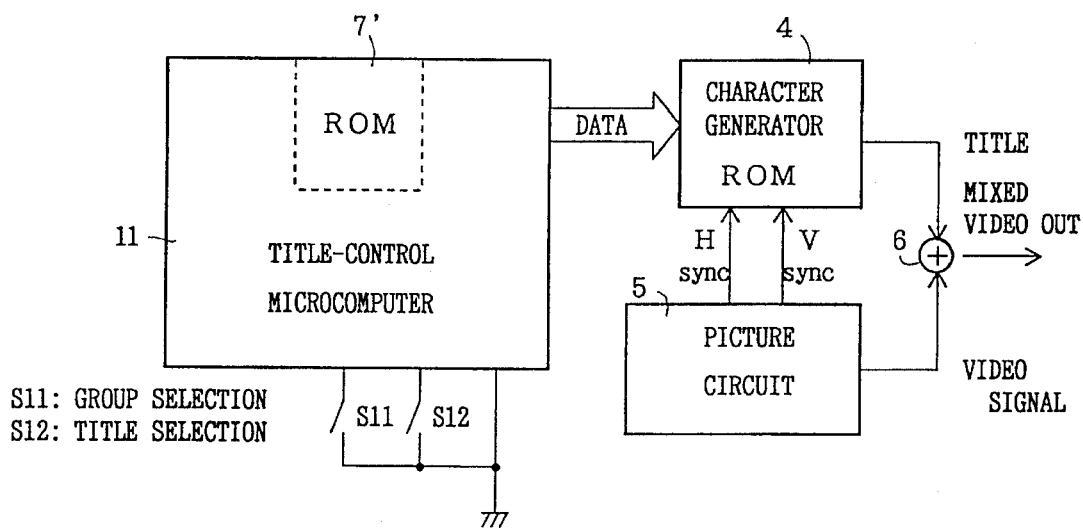
FIG. 6 is a block diagram of the titler of the second embodiment.

The second embodiment of the present invention is a titler which does not use time information. As shown in the block diagram of FIG. 6, the title control circuit 11 of the present embodiment does not include the clock circuit 2 or the RAM 8 (or the switches S3 and S4 for adjusting the clock) shown in FIG. 1.

Figure 7A:
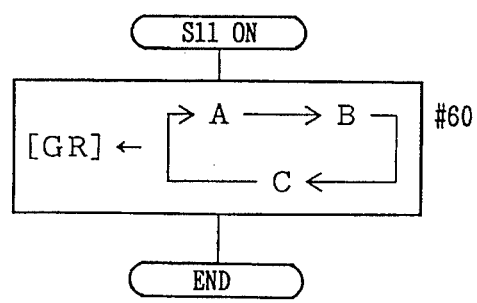
FIGS. 7A and 7B are flowcharts executed by the microcomputer of the second embodiment titler.
Figure 7B:
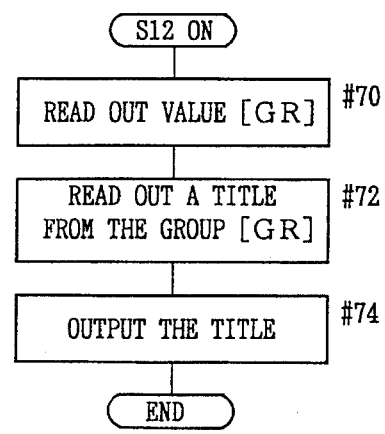

The control circuit 11 is connected to two switches S11 and S12. In the ROM 7', ready-made titles, as shown in Table 2, are stored but without attribute data. The titles are classified into groups according to situations in which they may be used. In the example of Table 2, the seventy-five titles are classified into three groups of equal numbers: twenty-five titles in group A relate to family affairs, group B to various sceneries and group C to school affairs. When the switch S11 is pressed, the CPU of the control circuit 11 executes the routine as shown in FIG. 7A. Here, the three groups A, B and C are cyclically selected every time the switch S11 is pressed, and the name (or code) of the group is put into a parameter [GR] at step #60. When the other switch S12 is pressed, the CPU of the controller 11 executes the routine shown in FIG. 7B. After reading the value of the parameter [GR] at step #70, the CPU reads out one of the titles in the group [GR] at step #72 and outputs the title to the CG-ROM 4 at step #74. By using an adequate pointer for each group, the CPU cyclically outputs titles in a group every time the switch S12 is pressed.

In this embodiment, without using attribute data or RAM, the number of titles appearing on the display can be reduced and the user can quickly and easily choose a desired title.

Figure 8A:
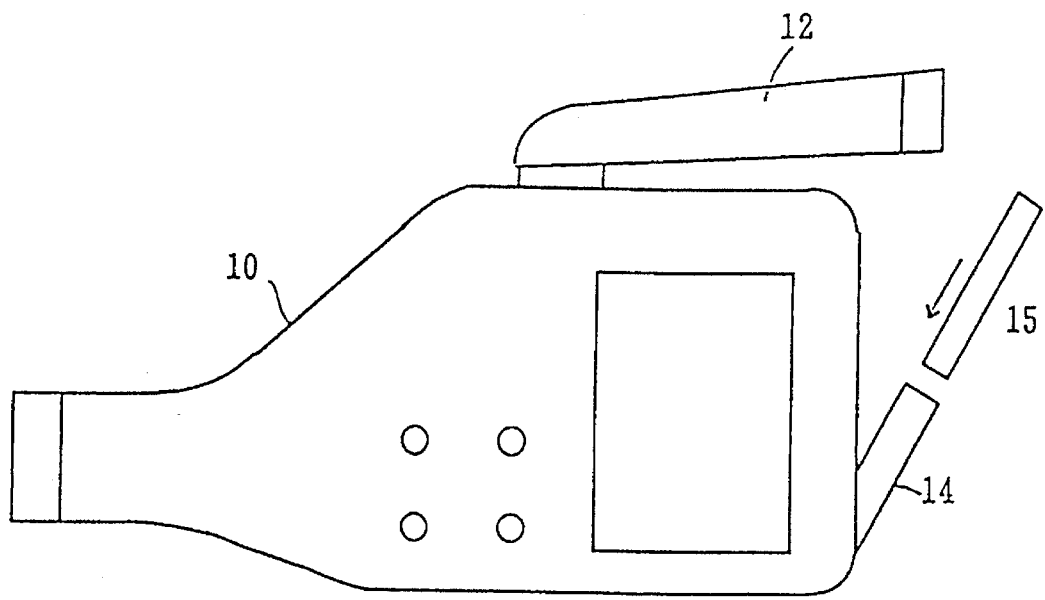
FIGS. 8A and 8B are a side view and a rear view of a video camera equipped with the titler of the third embodiment.
Figure 8B:
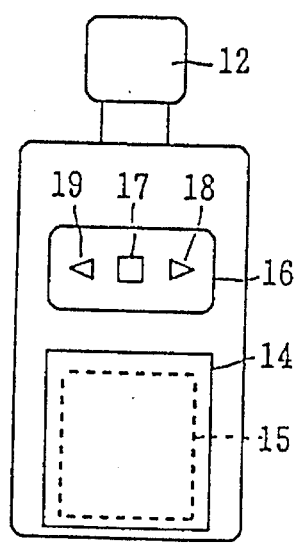

The third embodiment of the present invention is a titler which uses external title cards (memory cards) each containing a plurality of ready-made titles. FIGS. 8A and 8B show a side view and rear view of the video camera equipped with such a titler. At the rear end of the video camera body 10 is provided a card holder 14 in which the user inserts a title card 15 he desires.

Figure 9:
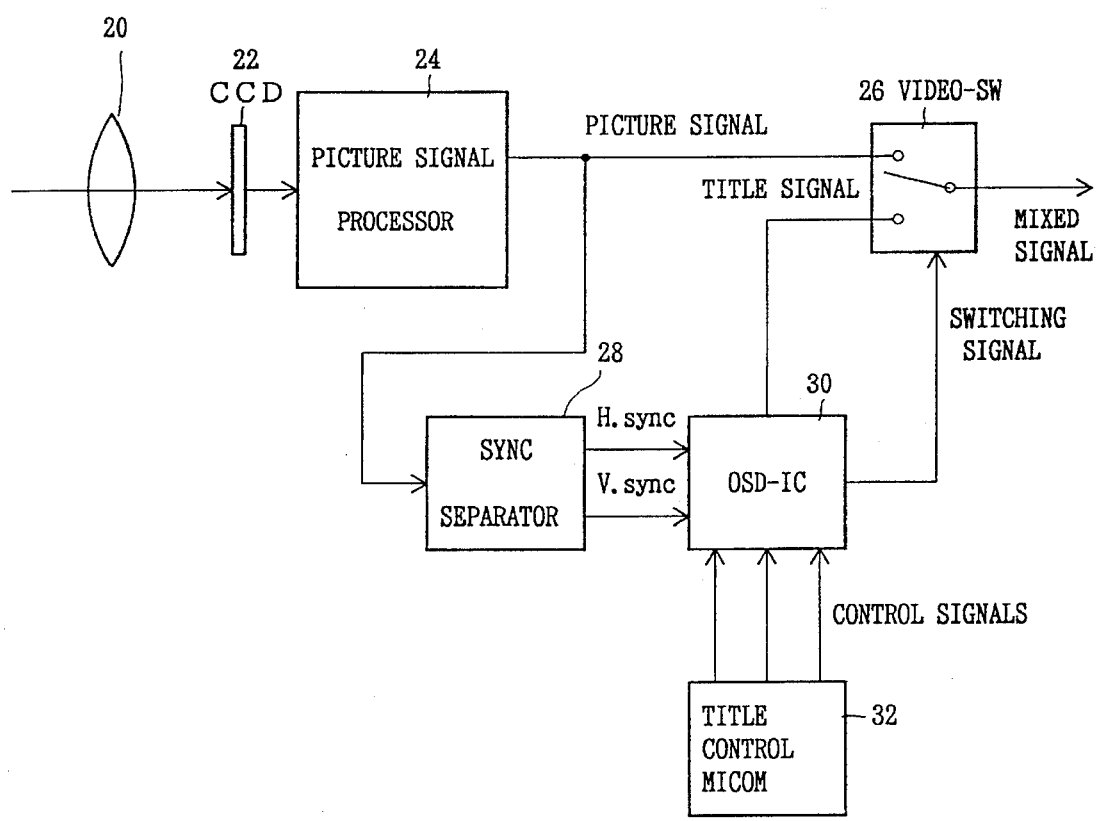
FIG. 9 is a block diagram of the titler of the third embodiment.

The electrical circuit is shown in FIG. 9. An image of a subject is projected through a lens unit 20 onto a solid state image sensor 22 using a CCD (charge coupled device). The light of the image is converted by the CCD 22 into electrical charges corresponding to the strength of incident light, and the electrical charges are sent to a picture circuit 24 in which a video signal of the image is produced. The video signal is sent to a video switch 26, and to a synchronizing signal separation circuit 28 where a horizontal synchronizing signal H sync and a vertical synchronizing signal V sync are separated from the video signal.

The video camera 10 uses an OSD-IC (onscreen display IC) 30 which is widely used in television receivers or video-tape recorders to superimpose letters on the display (CRT, etc.). In the present embodiment, the OSD-IC 30 is used to superimpose a title on the picture taken through the lens 20. The superimposed picture is shown in the monitor viewfinder display 12, and with proper key operation, is recorded on the tape. The OSD-IC 30 works under the control of a title control microcomputer 32. First, the OSD-IC 30 generates a title video signal synchronizing with the picture video signal of the picture circuit 24 using the H sync and V sync signals. The title video signal is also sent to the video switch 26. The OSD-IC 30 also generates a switching signal to control the video switch 26. According to the switching signal, the picture video signal and the title video signal are properly switched at the video switch 26, and a mixed video signal is produced in which a title is superimposed on the picture.

Figure 10:
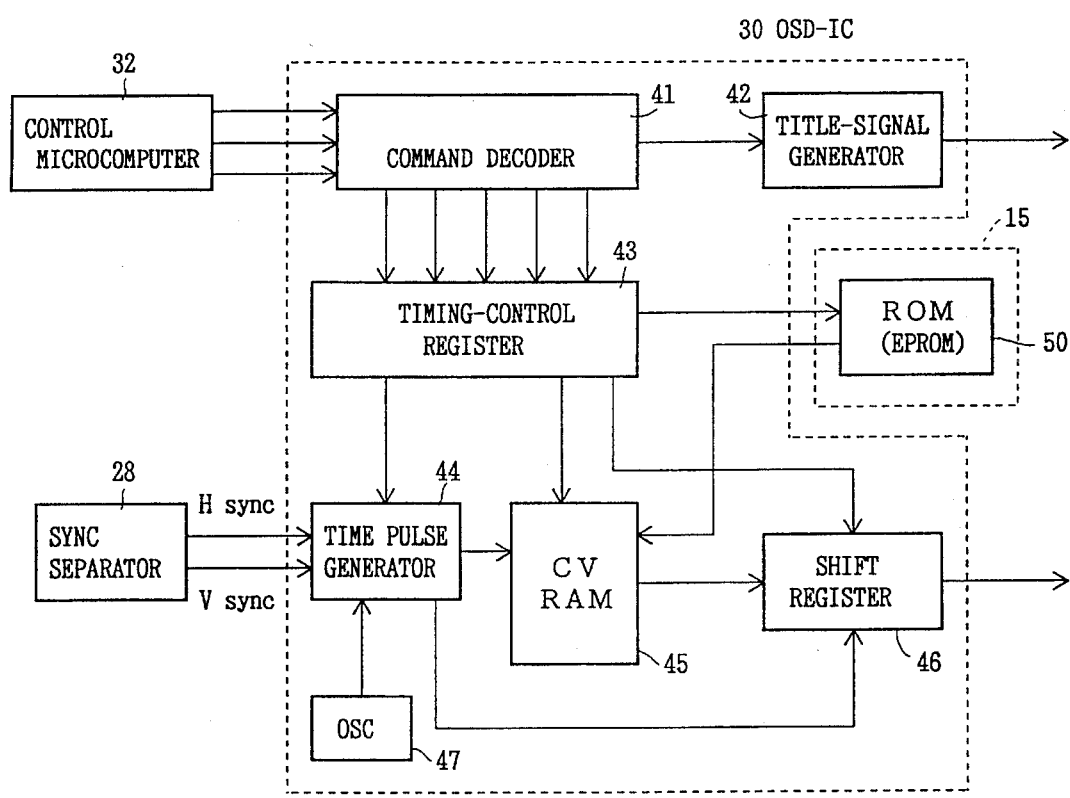
FIG. 10 is a detail block diagram of the OSD-IC (onscreen display IC) 30.

Details of the OSD-IC 30 are shown in FIG. 10. A command signal from the title control microcomputer 32 is decoded by a command decoder 41 of the OSD-IC 30, and is divided into control signals for the timing control register 43. The timing control register 43 controls a timing pulse generator 44, shift register 46, CV-RAM 45, a ROM 50 in the title card 15, etc. The CV-RAM 45 is prepared to store image data of a title. The timing pulse generator 44 sends timing pulses to the CV-RAM 45 and to the shift register 46 according to the synchronizing signals (H sync and V sync) from the separator circuit 28.

In the present embodiment, the ROM 50 storing a plurality of ready-made titles is provided in the title card, instead of in the video camera body as in the previous embodiments. However, for the convenience of explanation, a conventional case is first described where a CG-ROM is provided in the camera body.

When character codes for constituting a title are sequentially given from the title control microcomputer 32, corresponding dot pattern of each character is output from the CG-ROM to the CV-RAM 45, where an image of the title is constructed. The image data in the CV-RAM 45 is parallelly sent according to the synchronizing signals to the shift register 46, which convert the parallel data into serial data and output the switching signal to the video switch 26 (FIG. 9). The title-signal generator 42 outputs a fixed level video signal ("title signal") to the video switch 26, where the title signal is embedded in the picture video signal from the picture circuit 24 according to the switching signal from the shift register 46. Thus the mixed video signal conveying a picture taken by the video camera with a title superimposed thereon is produced.

In the CG-ROM is stored a set of character patterns (font). The necessary capacity of the CG-ROM is calculated as:

[number of dots constituting a character]× [number of characters].

By arranging characters prepared in the CG-ROM, the user can make a meaningful title. In other words, the CG-ROM should contain characters that various users might use. If only Roman alphabet or the like are used, the capacity of the CG-ROM is sufficient for almost 100 characters (26 alphabets×2 (lower case and upper case)+10 numerals+symbols (+, −, *, etc.)). If, however, normal Japanese expression is desired, the CG-ROM should contain over 4,000 chinese characters. Provided a chinese character requires 32×32 dots, the total capacity will be 4 mega-bits. A titler using such a large CG-ROM is impractical. One of the disadvantages is that the address bus for the CG-ROM should be wide. This complicates the circuit within the OSD-IC and other peripheral circuits.

In the present embodiment, no CG-ROM is used in the OSD-IC 30. Instead, a title ROM 50 is provided in a title card 15 separate from and attachable to the camera body 10.

Here the operation of the embodiment is described. First the user chooses a title card 15, suitable to the user's situation, among some (or many) title cards he has. The title card 15 is inserted in the card holder 14 at the back of the video camera 10. Above the holder 14 is provided an operation panel 16 on which an ON/OFF switch 17, a forward switch 18 and a backward switch 19 are placed. Every time the ON/OFF switch 17 is pressed, a title alternately appears and disappears in the viewfinder 12. When the title appears in the viewfinder 12, the other two switches 18 and 19 are effective. By pressing the forward switch 18, titles stored in the ROM 50 of the title card 15 are brought to the viewfinder 12 one by one according to a preset order (or the order of storage in the ROM 50). By pressing the backward switch 19, the titles are brought in the reversed order. In one system, each title is produced for every key depression, and in another system, titles automatically replace one another at a moderate time interval while the key 18 or 19 is pressed. The backward key 19 may be unnecessary, but it is very convenient and saves search time.

The number of titles stored in a title card 15 is preferably between 20–50. When a ROM (50) of 256 kilobit capacity is used in a title card, 256 characters can be stored in the ROM (provided a character is composed of 32×32 (=1024) dots). If a title uses an average of 12 characters, about 20 titles can be stored in the ROM. Similarly, 512 kilobit ROM can contain 40 titles. These calculations show that moderate capacity ROMs can be used in the present embodiment.

By preparing many title cards 15, a user can choose a title or group of titles suited to almost any situation. It is possible to provide a title card using an E$^2$PROM in which a user can write titles by himself.

In the above embodiment, titles in the ROM 50 of the title card 15 are stored in the form of dot data, or image data. This is advantageous when a special character or various font types are preferred. When simple titles (composed of simple letters only) are preferred, the ROM 50 in the title card 15 can store character code data. In this case, a CG-ROM is needed in the camera body 10, but the merit of quick access to a desired title among a large number of titles is maintained.

If a title card (memory card) is small enough, it is possible to hold plural title cards in a camera body 10, and select one of them with a manual switch. This broadens the freedom of selection and increases the chance of securing a desired title. By combining the feature of the first embodiment (outputting only those titles relating to the time information given from the clock), the accessibility to a desired title is not deteriorated even when the number of available titles is increased.

Figure 11:
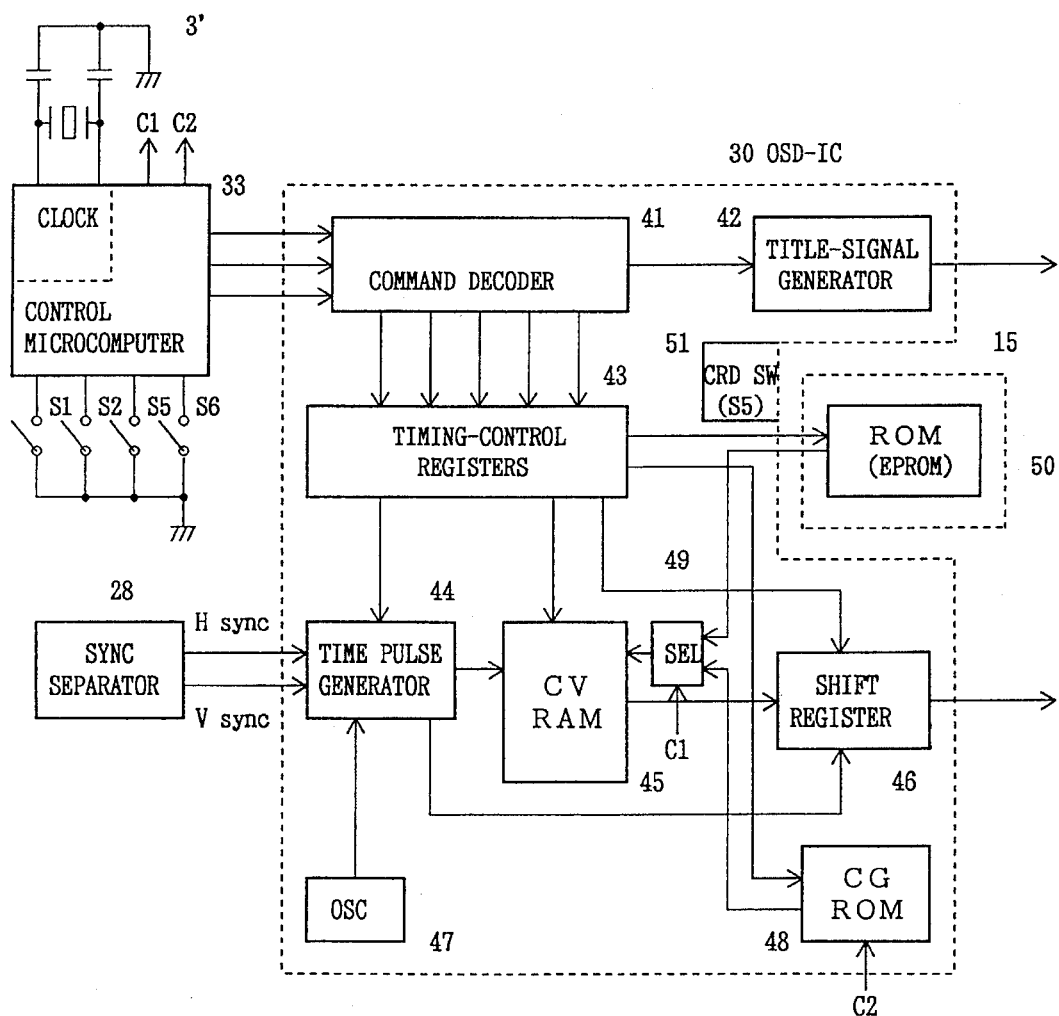
FIG. 11 is another block diagram of the OSD-IC 30 used in the fourth embodiment of the inventive titler.

The fourth embodiment of the present invention is a titler using both an external title card (as described in the third embodiment) and an internal title memory (as described in the first embodiment). The structure is shown in FIG. 11 in which an internal CG-ROM 48, a ROM selector (SEL) 49 and a card switch 51 are added in the OSD-IC 30 of FIG. 10. Similarly to the title control microcomputer 1 of FIG. 1, the title control microcomputer 33 of this embodiment includes a clock circuit which is connected to an external oscillation circuit 3'. The microcomputer 33 is connected to the card switch S5 (denoted as 51 in the OSD-IC block), and a manual switch S6, besides the titler main switch S1 for starting the titler function and the title selection switch S2 which are explained in the first embodiment. The card switch 51 detects the presence of a card 50 inserted into the camera.

Figure 12A:
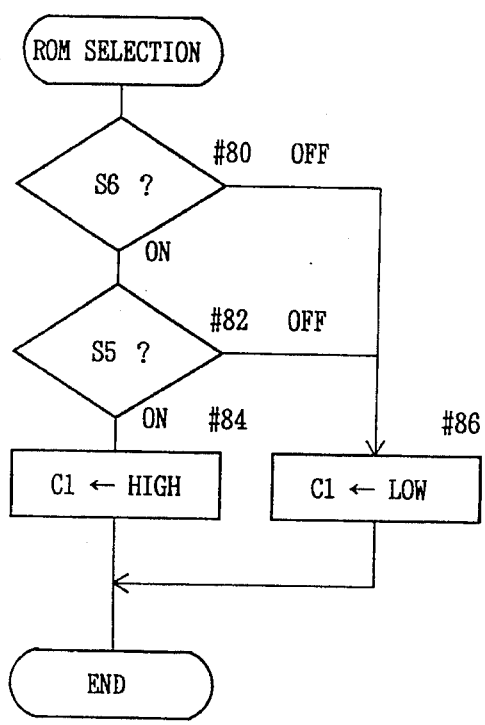
FIGS. 12A and 12B are two example flowcharts executed by the microcomputer of the fourth embodiment titler.

The microcomputer 33 executes the routine shown in FIG. 12A. First the manual switch S6 is checked at step #80. When the manual switch S6 is ON, the (S5) 51 is then checked at step #82. When the card switch (S5) 51 is ON (i.e., a card 15 is inserted in the card holder 14 of the camera body 10), the CPU of the microcomputer 33 sets a signal C1 at HIGH state (step #84), otherwise it sets the signal C1 at LOW (step #86).

Responsive to the HIGH state a card is inserted and the manual switch S6 is ON) of the signal C1 from the microcomputer 33, the title selector 49 connects the external ROM 50 to the CV-RAM 45 while cutting the connection between the internal ROM 48 and the CV-RAM 45. Thus, when the titler main switch S1 is turned on, the titles in the external title card 15 are selectively outputted to the display. Every time the title selection switch S2 is pressed, the titles stored in the external memory 50 appear on the display one by one. In the process, of course, the titles are checked using the time information given from the clock to determine if they fit that time information, and only those titles adequate to that time are selected.

When the title card 15 is removed from the camera body 10, the card switch (S5) 51 turns OFF, the signal C1 turns LOW (step #86), and the title selector 49 connects the internal CG-ROM 48 to tile CV-RAM 45. In this case, a title code signal C2 from the microcomputer 33 is converted to dot data by the internal CG-ROM 48 and the dot data is sent to the CV-RAM 45. The title image constructed in the CV-RAM 45 is similarly outputted to the display. Here, also unnecessary titles are omitted using the time information in the microcomputer 33.

Figure 12B:
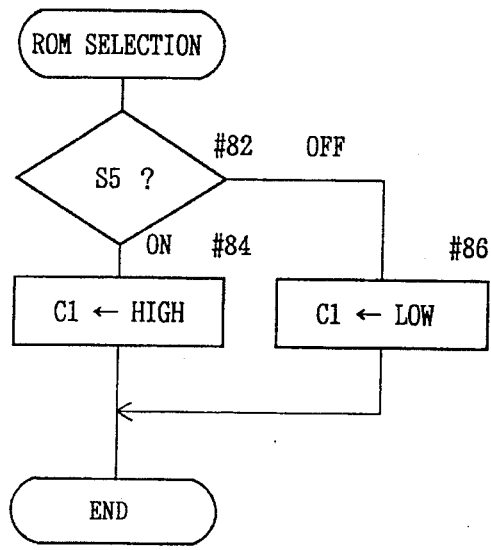

If the manual switch S6 is turned OFF, the signal C1 is set LOW irrespective of the attachment of a title card. In this case, the internal title is selected. Of course, the manual switch S6 is optional. FIG. 12B shows the case where the manual switch S6 is omitted. In this case, the external ROM is automatically selected when a title card 15 is inserted.

TABLE 1

| No. | Group A: Chronological titles | attribute |
| --- | --- | --- |
| 1 | HAPPY NEW YEAR | January |
| 2 | THE FIRST SUNRISE | January |
| 3 | NEW YEAR'S PRAYER | January |
| 4 | ST. VALENTINE'S DAY | February |
| 5 | COMMENCEMENT | February, March |

TABLE 1-continued

| 6 | GRADUATION CEREMONY | February, March |
| --- | --- | --- |
| 7 | GIRLS' FESTIVAL | March |
| 8 | ENTRANCE CEREMONY | April |
| 9 | CHILDREN'S DAY | May |
| 10 | MOTHER'S DAY | May |
| . | | |
| 19 | MERRY CHRISTMAS | December |
| 20 | NEW YEAR'S EVE | December |

| No. | Group B: Seasonal titles | attribute* |
| --- | --- | --- |
| 1 | SPRING VACATION | spring |
| 2 | FRESH VERDURE | spring |
| 3 | A WARM SPRING DAY | spring |
| 4 | CHERRY BLOSSOMS | spring |
| 5 | SPRING FLOWERS | spring |
| 6 | SUMMER VACATION | summer |
| 7 | SUMMER FESTIVAL | summer |
| 8 | SWIMMING | summer |
| 9 | SUMMER SEA | summer |
| 10 | SUMMER MOUNTAIN | summer |
| . | | |
| 29 | SKIING | winter |
| 30 | SNOWBALL FIGHT | winter |

| No. | Group C: General titles | attribute |
| --- | --- | --- |
| 1 | HAPPY BIRTHDAY | general |
| 2 | FAMILY TRIP | general |
| 3 | IN A MOUNTAIN | general |
| 4 | SEASIDE | general |
| 5 | HOLIDAY | general |
| 6 | CONGRATULATIONS | general |
| 7 | FISHING | general |
| 8 | MY FAMILY | general |
| 9 | ON TOUR | general |
| 10 | AT WORK | general |
| . | | |
| 19 | HOMEWARD BOUND | general |
| 20 | THE END | general |

*spring includes March, April & May,
summer includes June, July & August,
fall includes September, October & November, and
winter includes December, January & February.

TABLE 2

| No. | Group A: Family titles |
| --- | --- |
| 1 | HAPPY BIRTHDAY |
| 2 | OUR FIRST CHILD |
| 3 | WITH DADDY |
| 4 | WITH MAMMY |
| 5 | FIRST BIRTHDAY |
| 6 | WALKING ! |
| 7 | AT PARK |
| 8 | WITH HER DOLL |
| 9 | GRANDPARENTS |
| 10 | KINDERGARTEN |
| . | |
| 24 | TRAVEL ABROAD |
| 25 | FAMILY TRIP |

| No. | Group B: Scenery titles |
| --- | --- |
| 1 | SPRING '90 |
| 2 | FRESH VERDURE |
| 3 | A WARM SPRING DAY |

TABLE 2-continued

| 4 | CHERRY BLOSSOMS |
| 5 | SPRING FLOWERS |
| 6 | SUMMER '90 |
| 7 | SUMMER FESTIVAL |
| 8 | ON THE BEACH |
| 9 | SUMMER SEA |
| 10 | SUMMER MOUNTAIN |
| . | |
| . | |
| 24 | SNOW FIELD |
| 25 | HEAVY SNOWFALL |

| No. | Group C: Titles relating to school |
|---|---|
| 1 | KINDERGARTEN |
| 2 | TAKING A NAP |
| 3 | ELEMENTARY SCHOOL |
| 4 | ENTRANCE CEREMONY |
| 5 | SCHOOL EXCURSION |
| 6 | SUMMER VACATION |
| 7 | CAMPING |
| 8 | OUR TEACHER |
| 9 | SCHOOLMASTER |
| 10 | AT WORK |
| . | |
| . | |
| 24 | GRADUATION CEREMONY |
| 25 | COMMENCEMENT |

What is claimed is:

1. A title generating apparatus for superimposing a title onto a video signal of a picture shot by a camera, the apparatus comprising:

title storage means for storing a plurality of titles and outputting title signals corresponding to the stored titles;

output means for outputting an information signal corresponding to shooting information at the time of the picture shooting;

selecting means for selecting at least one title among the total number of titles stored by said title storage means based on the information signal outputted by said output means;

converting means for converting the title signals corresponding to the selected titles into title video signals; and superimposing means for superimposing the converted title video signals onto the video signal of the shot picture.

2. The apparatus according to claim 1, wherein said output means includes a clock circuit for outputting a time information signal corresponding to a clock time when the picture is being shot and said selecting means selects a title corresponding to the time information signal.

3. The apparatus according to claim 1, further comprising:

second title storage means for storing the titles selected by said selecting means and outputting title signals corresponding to the stored titles; and manually operable means for manually selecting one title among the titles stored by said second title storage means; wherein said converting means converts the title signal corresponding to the manually selected title into a title video signal; and said superimposing means superimposes the converted title video signal onto the video signal of the shot picture.

4. The apparatus according to claim 3, further comprising:

a picture circuit for generating a picture video signal of the shot picture;

means for generating a synchronizing signal for the picture video signal; and means for synchronizing the picture video signal with the title video signal corresponding to the manually selected title based on the synchronizing signal.

5. The apparatus according to claim 1, wherein each title in the title storage means has attribute information about picture shooting, and the selecting means selects a title by comparing the shooting information outputted by said output means and the attribute information of the title.

6. The apparatus according 1, wherein said selecting means indicates an address of said title storage means based on the shooting information and selects a title by pointing the address in the title storage means.

7. The apparatus according to claim 1, wherein the titles stored in said title storage means are divided into a plurality of groups in accordance with the shooting information and each group has a priority of selection.

8. The apparatus according to claim 1, wherein said title storage means is provided outside of the apparatus and is attachable to the apparatus for connection to the selecting means.

9. A title generating apparatus for superimposing a title onto a picture to be shot by a camera, the apparatus comprising:

title storage means for storing a plurality of titles and outputting title signals corresponding to the stored titles;

output means for outputting time information signal corresponding to the time when the picture was shot;

selecting means for selecting at least one title among the total number of titles stored by said title storage means based on the time information signal outputted by said output means;

converting means for converting the title signals corresponding to the selected titles into title video signals; and superimposing means for superimposing the converted title video signals onto the shot picture.

10. A title generating apparatus for superimposing a title onto a picture to be shot by a camera, the apparatus comprising:

a title storage device which stores a plurality of titles and outputs title signals corresponding to the stored titles;

an output device which outputs an information signal corresponding to shooting information at the time of the picture shooting;

a selecting device which selects at least one title among the total number of titles stored by said title storage device based on the information signal outputted by said output device;

a converting device for converting the title signals corresponding to the selected titles into title video signals; and a superimposing device which superimposes the converted title video signals onto the shot picture.

11. A title generating apparatus for superimposing a title onto a picture to be shot by a camera, the apparatus comprising:

a title storage device which stores a plurality of titles and outputting title signals corresponding to the stored titles;

an output device which outputs time information signal corresponding to a time when tile picture was shot;

a selecting device which selects at least one title among the total number of titles stored by said title storage device based on the time information signal outputted by said output device:

a converting device for converting the title signals corresponding to the selected titles into title video signals; and a superimposing device which superimposes the converted title video signals onto tile shot picture.

12. A title generating system for superimposing one or more prestored titles onto a video signal generated by a picture circuit of a video camera, comprising:

a title storage device for storing a plurality of predetermined titles, each title having an address related to an annual date or dates;

a clock circuit for outputting time information related to annual dates;

an output device which outputs time information corresponding to the generation of a video signal at the time of recording a picture;

display means for viewing the stored predetermined titles; and means for prioritizing the sequence of viewing the stored predetermined titles on the display means in response to the time information from the clock circuit and the time information from the output device to thereby address the stored predetermined titles.

* * * * *